United States Patent [19]

Hatakenaka et al.

[11] Patent Number: 5,239,382
[45] Date of Patent: Aug. 24, 1993

[54] IMAGE SENSING APPARATUS AND RECORDING/REPRODUCING METHOD THEREOF

[75] Inventors: Akira Hatakenaka, Musashino; Takeshi Mori, Machida, both of Japan

[73] Assignee: Olympus Optical Co., Ltd., Tokyo, Japan

[21] Appl. No.: 738,228

[22] Filed: Jul. 30, 1991

[30] Foreign Application Priority Data

Aug. 2, 1990 [JP] Japan .................................... 2-205762
Dec. 11, 1990 [JP] Japan .................................... 2-401321

[51] Int. Cl.⁵ ............................................. H04N 5/76
[52] U.S. Cl. .................................... 358/335; 358/342; 358/906; 358/909
[58] Field of Search ............... 358/335, 342, 906, 909, 358/310, 311, 312; 369/54, 58, 32, 33

[56] References Cited

U.S. PATENT DOCUMENTS

| | | | |
|---|---|---|---|
| 4,845,571 | 7/1989 | Hirano et al. | 358/342 |
| 4,979,159 | 12/1990 | Tsuruoka et al. | 369/58 |
| 4,982,074 | 1/1991 | Ogasawara | 235/454 |

Primary Examiner—Tommy Chin
Assistant Examiner—Robert Chevalier
Attorney, Agent, or Firm—Frishauf, Holtz, Goodman & Woodward

[57] ABSTRACT

The image sensing apparatus of the invention can easily and promptly search those areas of the main tracks of a floppy disk which store no data, or search or edit (e.g. copy) stored data, with the use of control data of a queue track and without an overhead. Further, it can automatically detect whether a recording medium is formatted upon insertion thereof, and then format it in a suitable manner if it has no formats.

9 Claims, 12 Drawing Sheets

F I G. 1

F I G. 2

F I G. 3

| BYTE \ BIT | 7 | 6 | 5 | 4 | 3 | 2 | 1 | 0 | |
|---|---|---|---|---|---|---|---|---|---|
| 0 | F7 | F6 | F5 | F4 | F3 | F | F1 | F0 | CHARACTERISTICS |
| 1 | colspan="8" | RECORD NAME (1 BYTE) | |
| ⋮ | colspan="8" | ⋮ | |
| 8 | colspan="8" | RECORD NAME (8 BYTE) | |
| 9 | colspan="8" | EXTENSION ELEMENT (1 BYTE) | |
| 10 | colspan="8" | EXTENSION ELEMENT (2 BYTE) | |
| 11 | colspan="8" | EXTENSION ELEMENT (3 BYTE) | |
| 12 | colspan="4" | MINUTE (LOWER POSITION) | colspan="4" | SECOND/2 | TIME |
| 13 | colspan="4" | TIME | colspan="4" | MINUTE (UPPER POSITION) | |
| 14 | colspan="4" | MONTH (LOWER POSITION) | colspan="4" | DATE | DATE |
| 15 | colspan="4" | YEAR | colspan="4" | MONTH (UPPER POSITION) | |
| 16 | colspan="8" | LEADING SECTOR | |
| 17 | colspan="8" | RECORD SIZE (SECTOR) | |
| 18 | colspan="8" | COMMENT (1 BYTE) | |
| ⋮ | colspan="8" | ⋮ | |
| 63 | colspan="8" | COMMENT (46 BYTE) | |

FIG. 4

| BYTE | |
|---|---|
| 0 | FORMAT NUMBER |
| 1 | DISK NAME (1BYTE) |
| ⋮ | ⋮ |
| 11 | DISK NAME (11BYTE) |
| 12 | DISK NUMBER |
| 13 | NUMBER OF USED SECTOR |
| 14 | NUMBER OF BAD SECTOR |
| 15 | NUMBER OF REMAINING |
| 16 | — |
| 17 | — |
| 18 | COMMENT (1BYTE) |
| ⋮ | ⋮ |
| 63 | COMMENT (46BYTE) |

FIG. 15

IMAGE SENSING APPARATUS AND RECORDING/REPRODUCING METHOD THEREOF

BACKGROUND OF THE INVENTION

1. Field of the Invention

This invention relates to an image sensing apparatus for digitalizing an electronically sensed still image and recording an image signal indicative of the still image in a recording medium, also to a recording/reproducing method thereof, and to initialization of the recording medium.

2. Description of the Related Art

There is an image sensing apparatus which receives an image, formed through a lens, by an image-sensing element such as a CCD (Charge-Coupled Device), detects an image signal generated by the sensing element, and records an image data, obtained by processing the image signal, in a recording medium such as a floppy disk.

This apparatus incorporates an electronic still camera for subjecting the image signal to image processing such as data compression, then recording the compressed data in a recording medium removably mounted in the apparatus, e.g. a floppy disk or an IC card. The electronic still camera is standardized as "still video floppy system" (EIAJ standard CP-3901).

According to the standards, the still video floppy disk (hereinafter called "floppy disk") has predetermined jacket size, disk size, electromagnetic characteristics, and track pattern. Similarly, the formats of a video signal recording system, a voice signal recording system, a digital data recording system, and a queue track are standardized.

In the above standards, the 52th track of the floppy disk is used as the queue track, and control codes to be used for the queue track are predetermined. The queue track stores control codes for automatic reproduction (serial reproduction, repeating reproduction, etc.) of video signals, voice signals, and digital data stored in 1st–50th main tracks. However, in the above standards, no methods of managing data stored in the main tracks are standardized.

Thus, in a system in which at least one part of each track is read out, a long overhead time may be required due to seek time at the time of searching tracks filled with data. Further, in a system in which data stored in each track must be reproduced for confirming the contents thereof, it is difficult to perform search or edition.

Moreover, floppy disks and IC cards to be used in the above-described electronic still camera must be initialized such that they have a predetermined format before data is stored therein.

That is, since the recording medium must be initialized such that it has a predetermined format, when used also in an image sensing apparatus, the user, in general, must perform complex initialization to obtain a predetermined format. In addition, there are a few conventional image sensing apparatuses which can set a recording medium to have a format in a state where the medium is inserted therein. These conventional apparatuses require a separate processing device such as an initializing system or a personal computer.

SUMMARY OF THE INVENTION

It is the object of the invention to provide an image sensing apparatus which can easily and promptly search those areas of main tracks of a floppy disk which store no data, or search or edit (e.g. copy) stored data, with the use of control data of a queue track and without an overhead, and further can automatically detect whether a recording medium is formatted upon insertion thereof, and then automatically initialize the recording medium to have a suitable format if it has no formats.

To attain the object, the invention provides an image sensing apparatus for recording in a recording medium an image signal supplied from an image sensing element, and its recording/reproducing method.

According to a first aspect of the invention, the image sensing apparatus comprises managing data read-out means for reading managing data out of a predetermined portion (queue track) of the recording medium; and recording means for recording the digital image data in an image-recording portion (main tracks) of the recording medium in response to the read-out managing data, and for renewing the managing data in accordance with a state of the recording medium assumed after the digital image data is recorded.

According to a second aspect of the invention, the recording method of recording in the recording medium an image signal supplied from an image sensing element, comprises the steps of reading managing data out of a predetermined portion (queue track) of the recording medium; determining an image storage state of the recording medium on the basis of the read-out managing data; and recording the image signal in an image-recording portion (main tracks) of the recording medium in accordance with the determined image storage state, and renewing the managing data in accordance with a state of the recording medium assumed after the image signal is recorded.

According to a third aspect of the invention, the reproducing method of reading out an image signal recorded in a recording medium, and displaying it by display means, comprises the steps of reading managing data out of a predetermined portion (queue track) of the recording medium; determining an image storage state of the recording medium on the basis of the read-out managing data; reading an image signal out of an image-recording portion (main tracks) of the recording medium; and displaying the read-out image signal and managing data by the display means.

According to a fourth aspect of the invention, the image sensing apparatus comprises image sensing means for sensing an image; converting means for converting the image signal to a digital signal in a given manner determination means for determining, upon insertion of the recording medium, whether or not the recording medium is formatted; and recording means for formatting the recording medium in a given manner if the determination means determines that the recording medium does not have a predetermined format, and for recording the converted image signal in the recording medium if the determination means determines that the recording medium has the predetermined format, or after the formatting has been completed. Thus, the apparatus detects, upon mounting the recording medium, whether or not the recording medium has a format, and formats the medium if it is not formatted.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The invention will be explained with reference to the accompanying drawings showing embodiments thereof.

Figure 1:
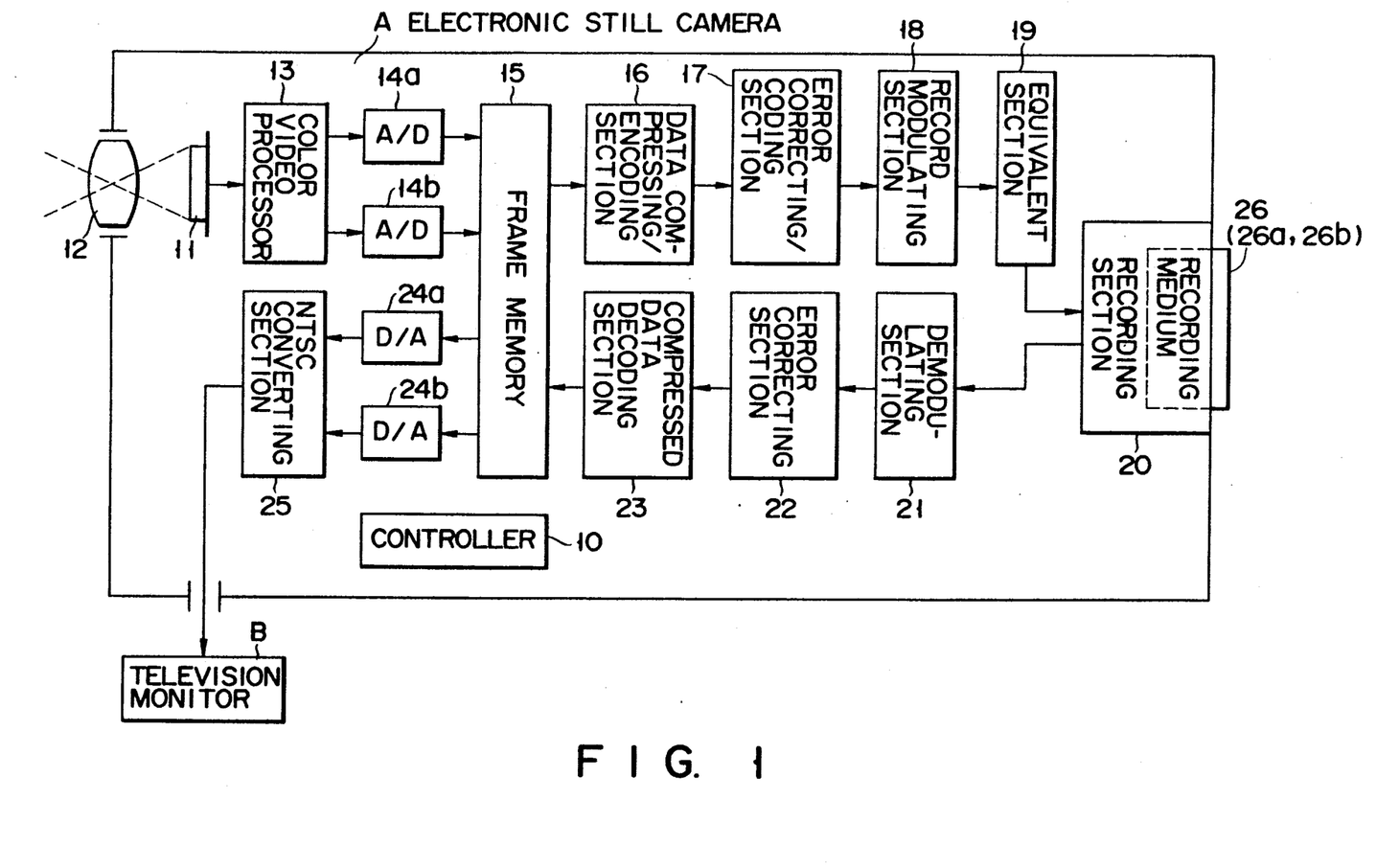
FIG. 1 is a block diagram schematically showing an electronic still camera according to a first embodiment of the invention.

FIG. 1 shows an electronic still camera of a first embodiment of the invention. The still camera comprises a controller 10 for controlling operations of structural components thereof, an image-sensing section (11, 12), and a video signal-processing section (13-25).

The image-sensing section comprises a solid sensing element 11 consisting of a CCD or so for subjecting an input image to photoelectric transfer, and an optical lens 12 for forming a sensed image in the image pick-up surface of the solid sensing element 11, respectively.

The video signal-processing section is constructed such that an image data signal supplied through the solid sensing element 11 and a color video processor is subjected to various processings, and then recorded in a recording medium.

The color video processor 13 performs video signal processings such as $\gamma$ correction of an electronic still image signal supplied from the image-sensing system 11 and 12, and color separation of the signal into a brightness signal component and a color difference signal component.

The image data thus obtained is subjected to data compression to have a high density. The sensed image data is then recorded in a magnetic recording medium 26 of a floppy disk or the like. Further, the image data stored in the floppy disk is read therefrom, then decoded and displayed in a television monitor B.

Then, recording of the electronic still image signal will be explained.

The brightness signal and the line-sequential color difference signal are converted to digital signals and written into a frame memory 15 via A/D converters 14a and 14b, respectively.

The data read out of the frame memory 15 is input to a data compressing/encoding section 16, where data compression comprising the steps of e.g. vertical conversion, linear quantization, and entropy encoding is performed.

One frame electronic still image signal having its data compressed by the data compressing/encoding section 16 is input to an error correcting/encoding section 17, where the compressed data is encoded by utilizing a double Reed-Solomon product code using parities of C1 (41, 37, 5) and C2 (36, 32, 5).

The image signal obtained from the section 17 is supplied to a record modulating section 18, where the image signal is subjected to 8-10 conversion and its direct current component is restrained. Then, the signal is subjected to amplitude and phase equivalent processing in an equivalent circuit 19, and is then recorded in a magnetic recording medium (e.g. floppy disk) 26 mounted in a recording section 20.

The operation of recording image data in the floppy disk 26a will be explained based on the disk formatting data (disk managing data) stored in the queue track.

Figure 2:
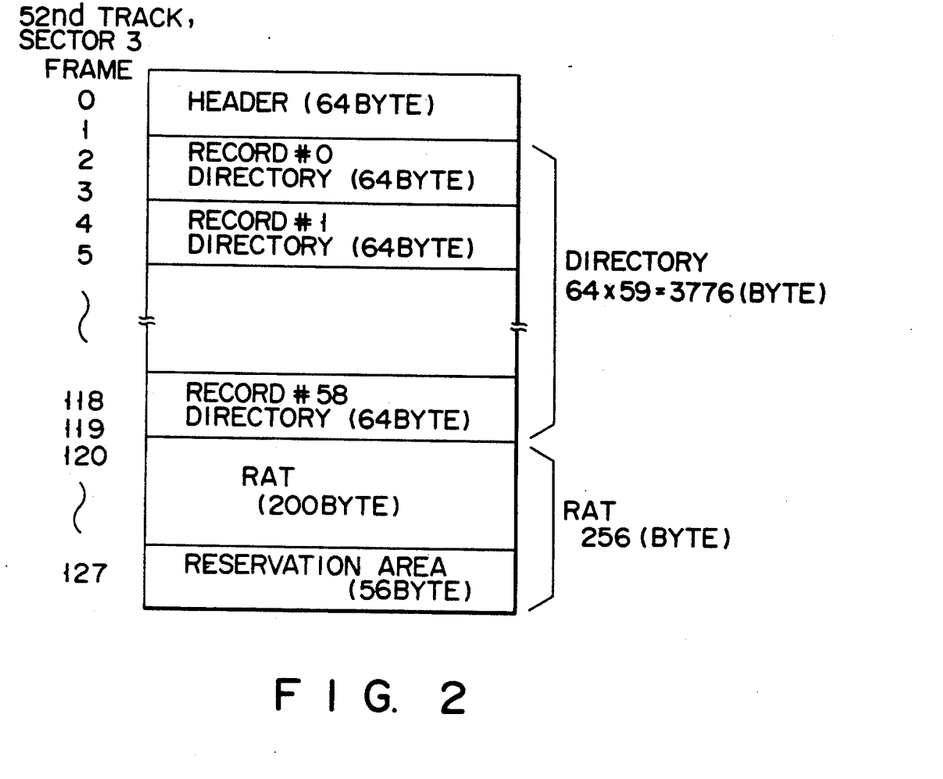
FIG. 2 is a view showing disk managing data stored in a queue track.

FIGS. 2-5 show formats of the disk managing data. Specifically, FIG. 2 shows the disk managing data stored in the queue track, FIG. 3 a RAT (Record Allocation Table) in the disk managing data, FIG. 4 a directory in the disk managing data, and FIG. 5 a header in the disk managing data.

As is shown in FIG. 2, the disk managing data comprises a header area, directory areas, and a RAT area. The header length is 64 bytes, the directory length of one record 64 bytes (i.e., the directory lengths of all records 0–58 3776 bytes), and the RAT length 200 bytes. The remaining area of 56 bytes is used as reservation area.

Figure 3:
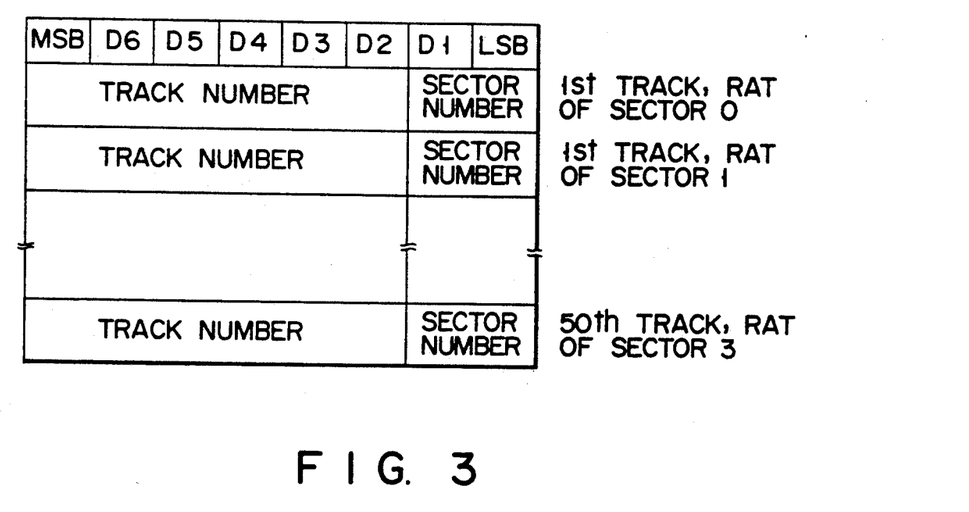
FIG. 3 is a view showing a RAT contained in the disk managing data.

As is shown in FIG. 3, the sectors of the RAT area correspond to the sectors of main tracks. Each sector of the RAT area has a length of 1 byte, and has the following construction:

(00)16: the sector is not used and hence is able to be used;

(CC)16: skip the sector;

(FF)16: the sector is the last one in the record;

(40)16 - (CB)16: the sector has a number corresponding to the record of the next directory; the leading sector number of each record is registered in a corresponding directory.

Figure 4:
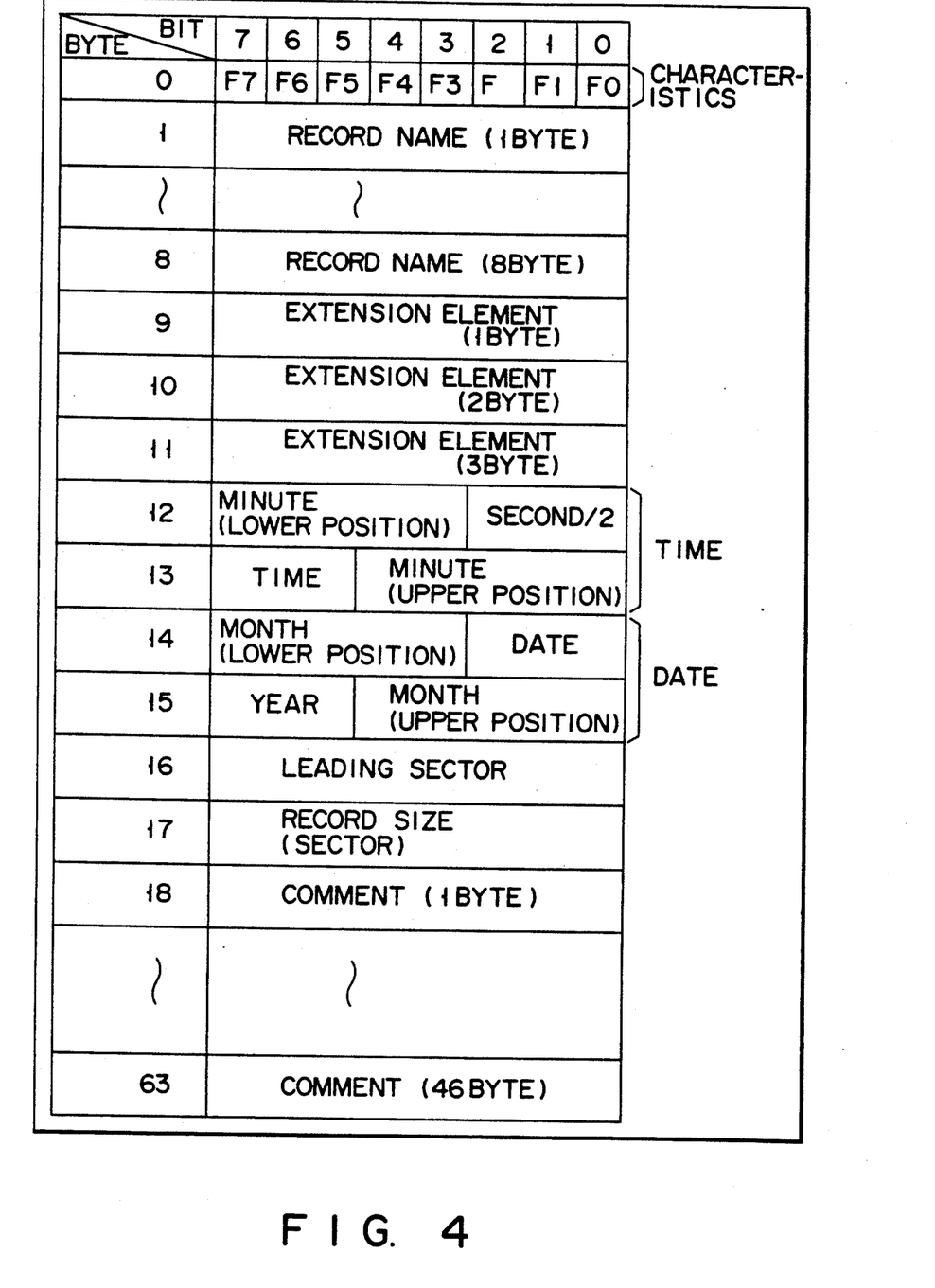
FIG. 4 is a table of a directory contained in the disk managing data.

As is shown in FIG. 4, the directory has the following control data:

Byte 0 indicates the characteristics of a record.
Bits F7-F0 have the following meaning:
F7: bit value "0" indicates that the record is not used;
F6: bit value "1" indicates that the record has been erased;
F5: bit value "1" indicates that write-in and erasion is prohibited;
F4: bit value "1" indicates that read-out is prohibited;
F3: reservation bit; the bit value is set to "1" when a record is written therein;
F2: not used;
F1, F0 indicate contents of the record;
00: image; 01: voice; 1X: other data.
Bytes 1-8: the names of records;
Bytes 9-11: extended record names;
Bytes 12 and 13: the time at which recording has been performed or at which the last edition has been performed;
Bytes 14 and 15: the dates at which recording has been performed and at which the last edition has been performed;
Byte 16: the leading sector number of a record;
Byte 17: the record size of each sector;
Bytes 18-63: comments to be used usually for explaining records.

In addition, a record #0 is reserved for registering a bad sector. A bad sector, if found at the time of examining a disk, will be recorded in the record #0, thereby being protected from inadequate access thereto.

Figure 5:
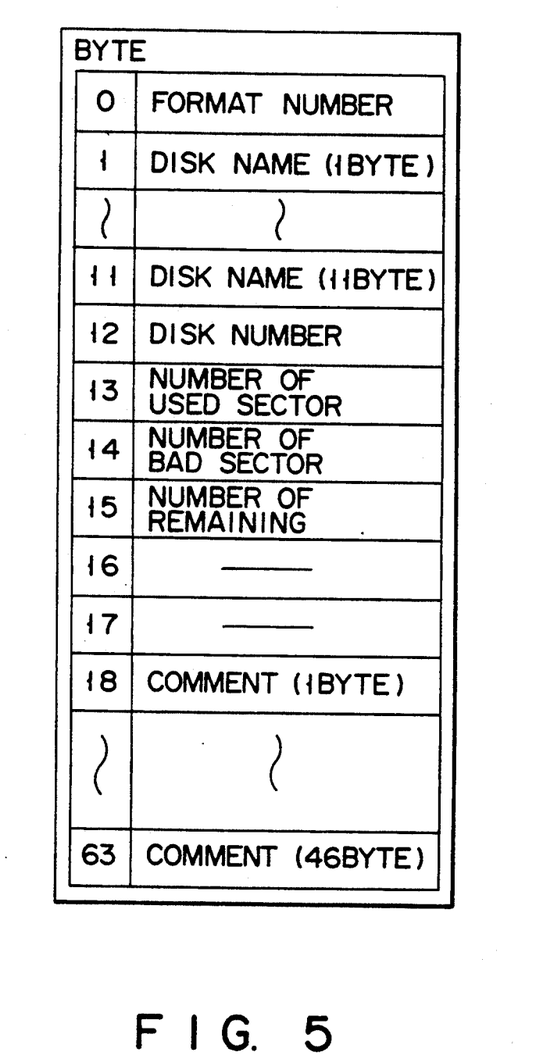
FIG. 5 is a table of a header contained in the disk managing data.

FIG. 5 shows the header area in detail.

Byte 0 registers a format number. This number is determined in consideration of version-up which may be executed in the near future. The present format is numbered "1".

Bytes 1-11: the names of disks;
Byte 12: disk numbers. The user is free to write disk numbers herein so as to manage a plurality of disks;
Byte 13: the number of used sectors;
Byte 14: the number of bad sectors;
Byte 15: the number of remaining sectors;
Bytes 18-63: comments.

At the time of recording image data, renewal is performed as follows: The numbers of the used sectors and remaining sectors are renewed in the header area shown in FIG. 5. The characteristics of unused or erased records, record names, extended names, time stamp, leading sector, and record size are renewed in the directory shown in FIG. 4. Moreover, the used sectors are renewed in the RAT area shown in FIG. 3.

Figure 6A:
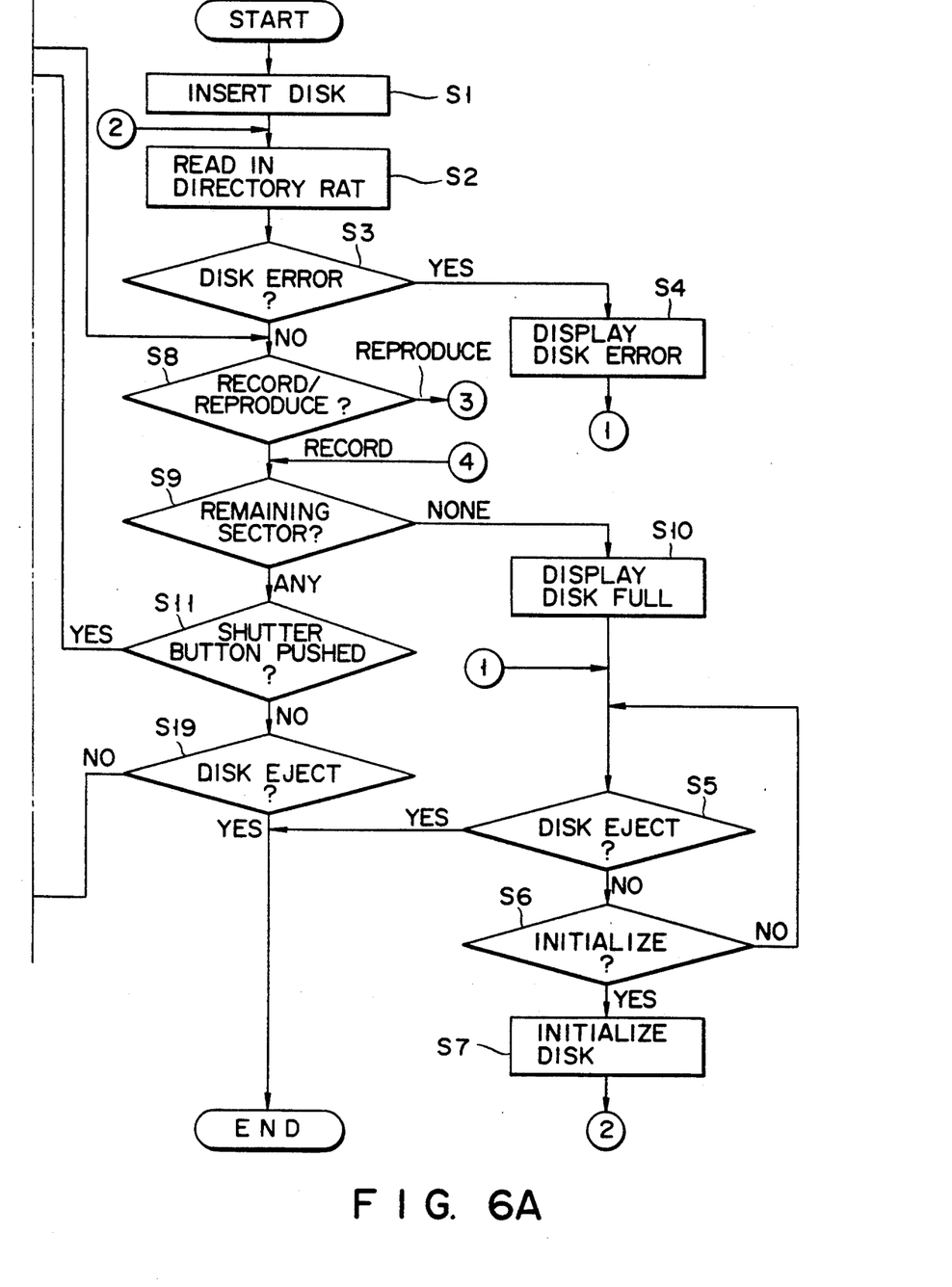
FIGS. 6A, 6B and 6C are flowcharts showing the operation of the camera at the time of recording and reproducing.
Figure 6B:
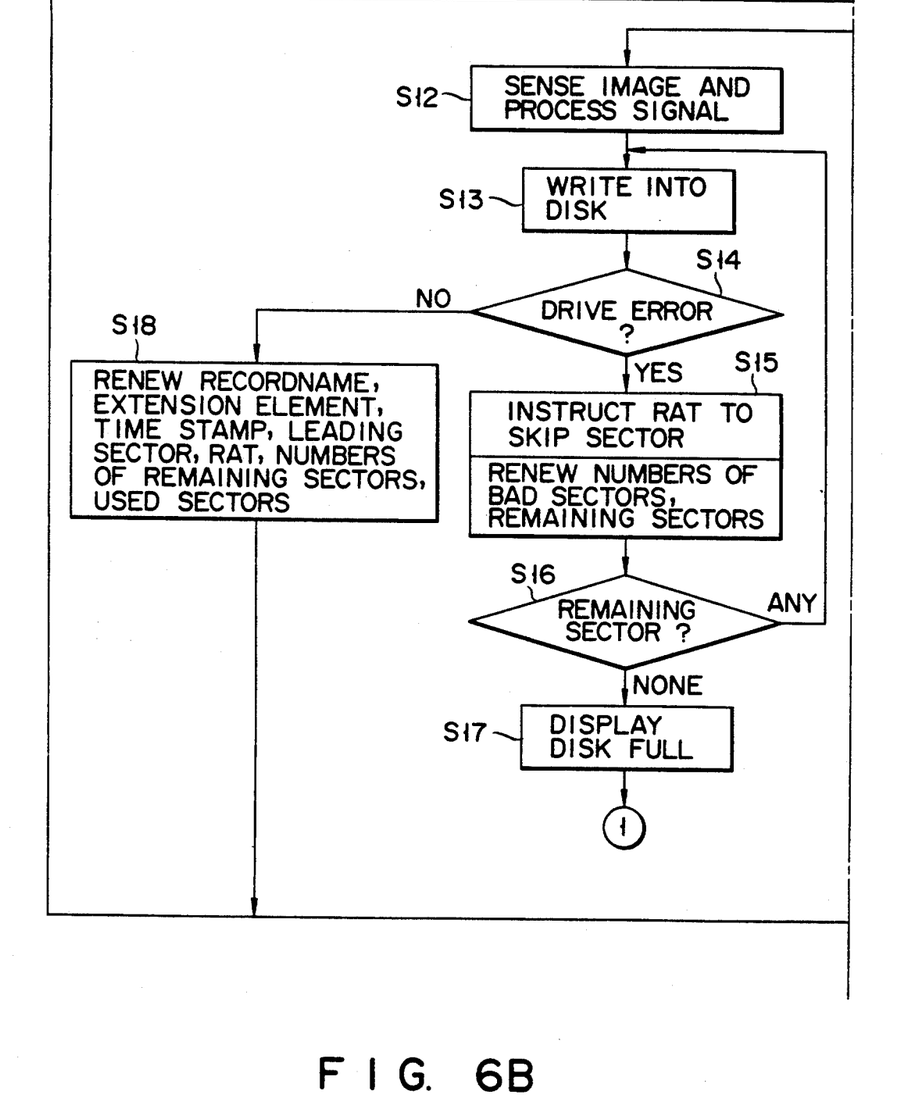
Figure 6C:
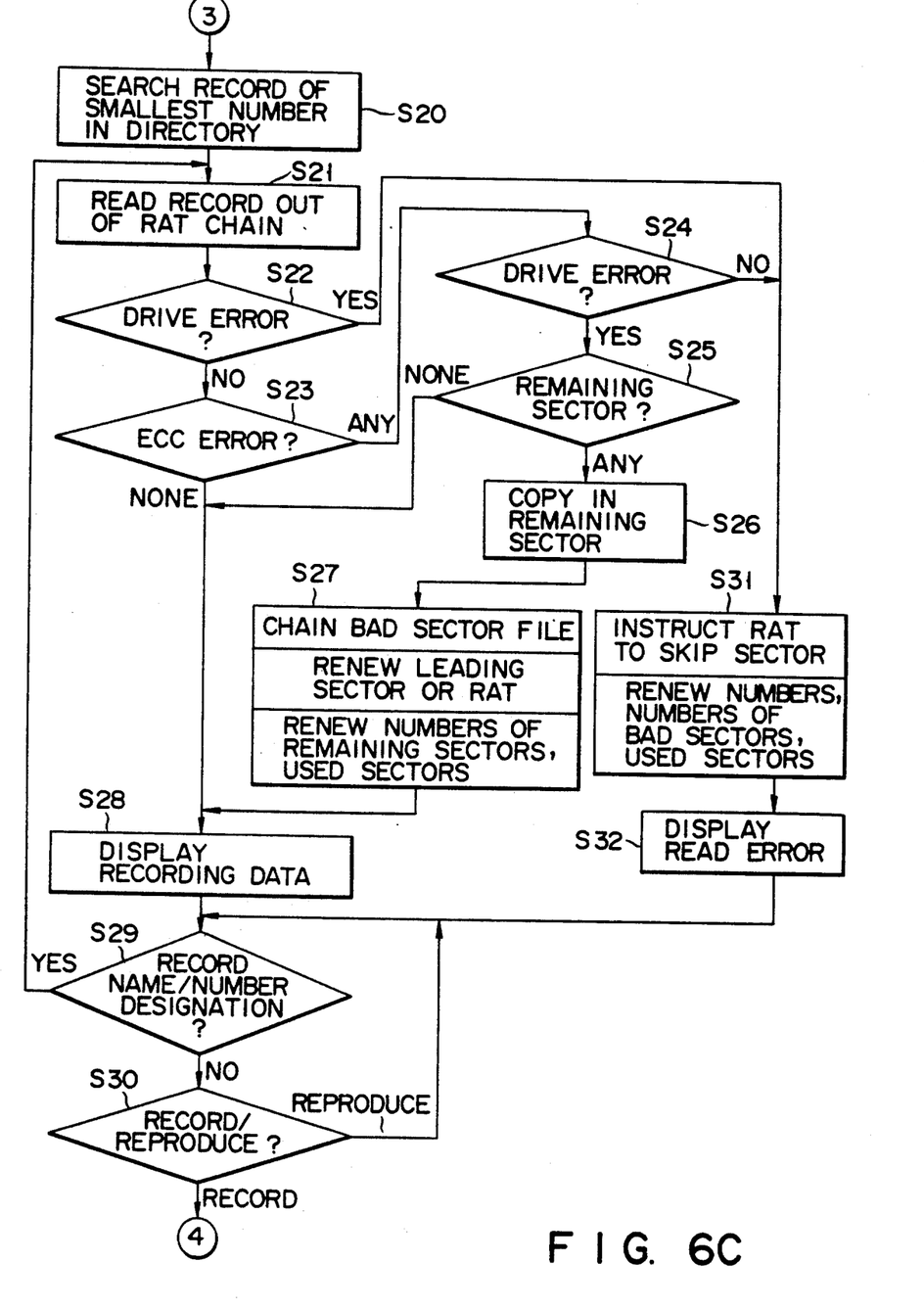

Then, the operation of the above embodiment at the time of recording and reproducing will be explained with reference to the flowchart of FIG. 6.

In a step S1, the floppy disk 26a is inserted in an electronic still camera A, and then in a step S2, the data stored in the header, directory, and RAT are read into the operation memory of the controller 10. At this time, if a disk error is detected in a step S3, the error is displayed in a step S4, and then the program proceeds to a step S5, where the disk is ejected and the operation in the step S2 is again performed. If the disk is not ejected, the disk is initialized in a step S7, followed by termination of the program. The operations in the steps S5-S7 are hereinafter referred to as "error eliminating operation".

In a step S8, it is determined whether the present mode is recording mode or reproducing mode. If it is recording mode, the number of remaining sectors in the header area in FIG. 5 is detected in a step S9. If the number is 0, "Disk Full" is displayed in a step S10, followed by error eliminating operation in the steps S5-S7.

On the other hand, if the number of the remaining sectors is not 0, image sensing is performed in steps S12-S18 each time a shutter button is pushed in a step S11. The operations of the steps S8-S19 are repeated until the disk is ejected in the step S19, or until it is determined in the step S17 that the disk is full, or until the mode is shifted to the reproducing mode in the step S8.

If drive error is detected in a step S14 after data is written into the disk in a step S13, flag (cc) 16 instructing the present RAT to skip one sector is set in a step S15, thereby renewing the numbers of bad sectors and remaining sectors in the header area. At this time, if it is determined in a step S16 that the number of the remaining sectors is 0, "Disk Full" is displayed in a step S17, and then the error eliminating operations are performed in the steps S5-S7. If it is determined in the step S16 that the number of the remaining sectors is not 0, writing is performed again in the skipped sector.

If writing operation in the disk has succeeded, the program proceeds to a step S18, where data such as a record name is stored for the record of the directory, and further the numbers of used and unused sectors. A default name is used as the record name as long as no particular instructions are input by the user, and the number of the record is set in the extension element.

In the reproducing mode, in a step S20, records filled with data are searched in the directory data read in the operation memory of the controller 10 in the step S2, and a record of a smallest number is read out (the record #0 is not read out as such a record since it is used for recording a bad sector). In a step S21, records are serially read out of a sector-chain in the RAT area. At this time, if drive error occurs in a step S22, or if an error is detected by the error correction code in a step S23, and then it is determined in a step S24 that the error cannot be corrected, the (CC)16 flag instructing the RAT to skip one sector is set in a step S31, thereby renewing the numbers of the bad sectors and remaining sectors, and then "Read Error" is displayed in a step S32, followed by processing in a step S29. If the data error can be corrected, the number of the remaining sectors are detected in a step 25, followed by operation in a step S26 when the number of the remaining sectors is not 0. In the step S26, the corrected data is copied in a sector to be able to be used, and the copied sector is connected to the leading sector or to the sector chain in the RAT. In a step S27, the sector in which error has occurred is connected to the record for a bad sector in a step S27, followed by processing in a step S28. In the step S28, the read-out data is supplied to a signal processing section and output to a monitor, and then is subjected to processing in a step S29.

If it is determined in the step S25 that the number of the remaining sectors is 0, or if it is determined in the step S23 that error does not occur, the program proceeds directly to the step S28, where the read-out data is supplied to the signal processing section and output to the monitor, followed by the processing in the step S29.

In the step S29, it is determined whether or not the name and number of a record to be reproduced is designated. If the answer is Yes, reproduction processing in steps S21-S28 is repeated. If, on the other hand, the answer to the question of the step S29 is No, it is determined in a step S30 whether or not the mode is changed. If the mode is changed to recording mode, the program proceeds to a step S9. On the other hand, if the mode is not changed to the recording mode, the program returns to the step S29, where reproduction is repeated.

Then, the operation of the apparatus at the time of reproduction will be explained with reference to FIG. 1.

The image data read out of the floppy disk 26a is input to a demodulating section 21, which cooperates with a record modulating section 18 to demodulate, in response to the direct current interrupting characteristics of the magnetic head, the signal modulated by restraining the direct current component thereof.

The demodulated signal is input to an error correcting section 22, where data error is corrected by using an error correction code obtained by the above-mentioned error correcting/coding processing.

That output of the error correcting section 22 whose data is compressed is decoded in a compressed data decoding section 23 This decoded image data signal is stored in the frame memory 15. Thereafter, brightness signal components and color difference components are output serially and repeatedly, and are restored to the original analog signals via D/A converters 24a and 24b, respectively.

The restored analog signals are input to an NTSC converting section 25, where they are converted to NTSC television signals and reproduced as images on the TV monitor B.

As described above, in the first embodiment, to record and reproduce images, the sectors are managed by utilizing the disk managing data. Further, each record is managed by using a logic number or record number. Thus, those sectors of a floppy disk which are not used can be effectively used.

A second embodiment of the invention will be now explained with reference to FIG. 7.

Figure 7:
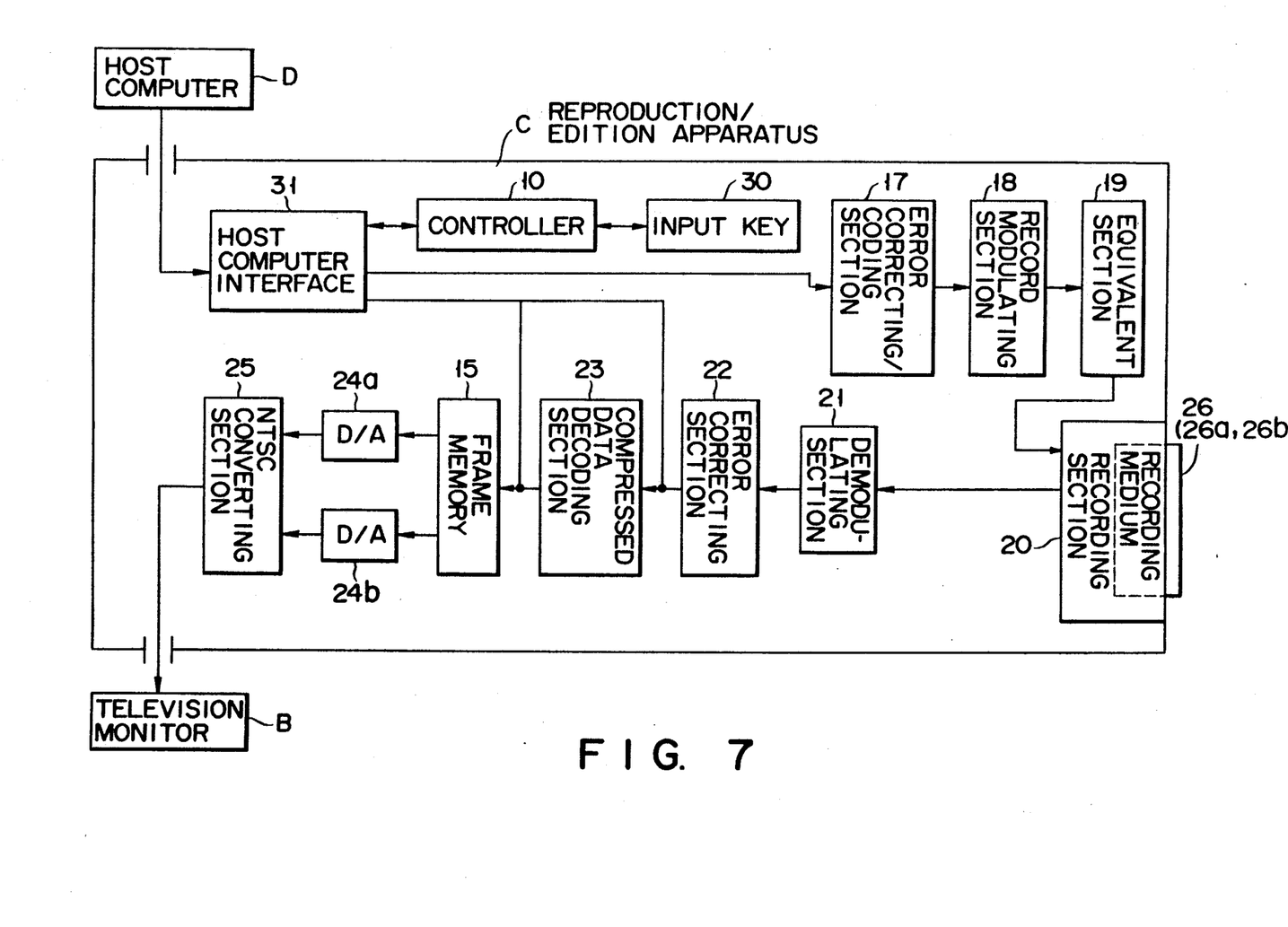
FIG. 7 is a block diagram schematically showing a reproducing/editing apparatus according to a second embodiment of the invention.

FIG. 7 shows a reproducing/editing apparatus C of the second embodiment. This apparatus C is similar to the electronic still camera A of the first embodiment in that data is read out of the still video floppy disk 26a, and thereafter is output to the TV monitor B via the demodulator 21, error correcting section 22, compression data decoder 23, frame memory 15, D/A converters 24a and 24b, and NTSC converting section 25, and also in that data is written into the floppy disk 26a via the error correcting/coding section 17, record modulating section 18, and equivalent section 19.

The reproducing/editing apparatus C is equipped with an input key section 30 having a plurality of keys, through which the record names, extension elements, comments, characteristics of each record, time stamp, etc., of the directory area shown in FIG. 4, the disk names, comments, etc., of the header area shown in FIG. 5 can be changed with ease.

In addition, the apparatus C can be connected to a host computer by means of a host computer interface 31. By virtue of the connection to the host computer, the apparatus can be used as an image file system supported by a large capacity memory device and having various functions such as high technical image edition including cut-and-paste of video data, garbage collection of a sector-in-use of each record, indefinite record name designation (e.g. standard expression), and move-ment/elimination of a record by means of time stamp designation.

It is a matter of course to connect the electronic still camera A of the first embodiment to the host computer by means of an interface, thereby achieving a similar system to the above.

According to the first and second embodiments, the electronic still camera, equipped with a floppy disk serving as recording medium and storing disk managing data in a given area, can effectively manage the sectors of the disk, and search, copy, and reproduce stored data. Further, this camera has enhanced operability, applicability, and maintainability in utilizing the stored data. Thus, the invention can provide an electronic still camera and its recording/reproducing method which can easily and promptly search those areas in the main tracks of a floppy disk which are not used, and also search or copy data stored in the main tracks, with the use of control data stored in the queue track, without causing an overhead.

An image sensing apparatus of the third embodiment of the invention will be explained with reference to FIG. 8.

The apparatus relates to the recording section for storing compressed data in the first embodiment.

Figure 8:
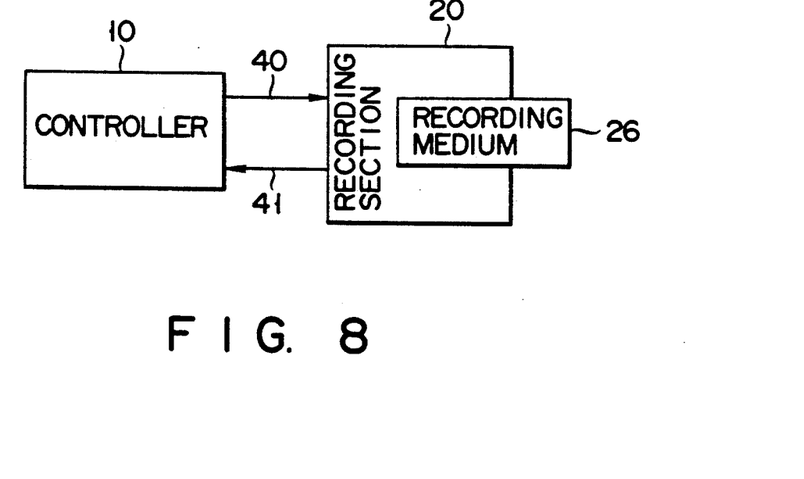
FIG. 8 is a block diagram schematically showing the recording section of an image-sensing apparatus according to a third embodiment of the invention.

FIG. 8 shows a recording section 20 having a recording medium 26 such as a floppy disk or an IC card, for storing compressed data, and a controller 10 for controlling the section 20.

The recording section 20 is connected to the controller 10 via signal lines 40 and 41. The signal line 40 transmits a detection signal from the controller 10 to the section 20, and another signal line 41 transmits an instruction from the section 20 to the controller 10, for causing the controller 10 to format the recording medium 26.

Figure 9:
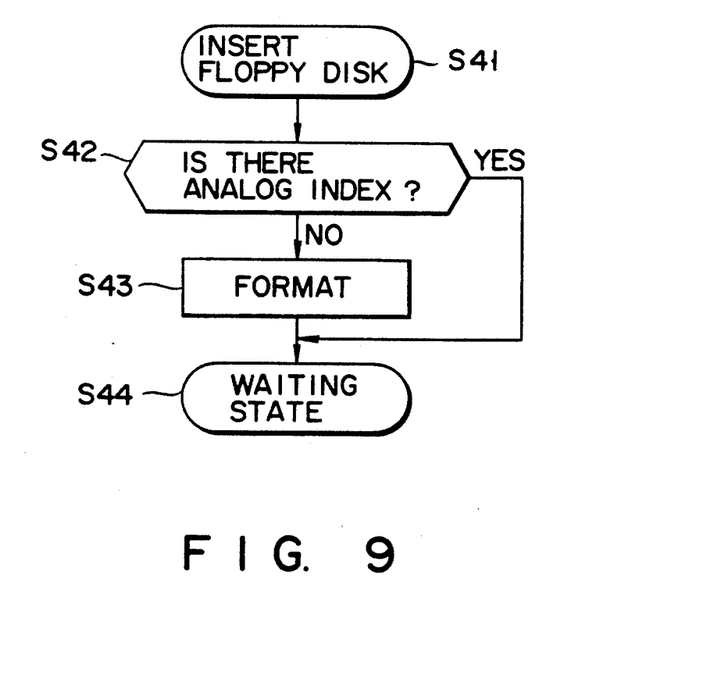
FIG. 9 is a flowchart showing a process of formatting recording medium incorporated in the recording section shown in FIG. 8.

The manner of formatting the recording medium 26 will be described with reference to the flowchart of FIG. 9.

First, in a step S41, the recording medium 26 such as a floppy disk or an IC card is mounted in the recording section 20. Then, it is detected by the recording section 20 in a step S42 whether or not the recording medium 26 has an analog index, i.e., whether or not it is formatted and initialized, and then a detection signal is supplied to the controller 10 via a signal line 41. If the answer to the question in the step S42 is No, the program proceeds to a step S43, where the controller 10 transmits an instruction to the recording section 20, thereby initializing the recording medium 26. If, on the other hand, the answer to the question in the step S42 is Yes, or after the medium 26 is formatted in the step S43, the program proceeds to a step S44, where the recording section 20 is kept in a state in which data can be input thereto.

Subsequently, the controller 10 supplies digitalized compressed data from its compression part (not shown) to store it in the recording medium 26.

In the third embodiment, if analog signal data is stored in the recording medium 26, it will be automatically erased when the medium 26 is mounted in the recording section 20 and formatted.

For preventing erroneous erasion of data, it is needed to detect whether the disk has analog data or digital data, or whether it is not formatted, and then to perform initialization to set a format, in accordance with the state of the medium 26.

Figure 10:
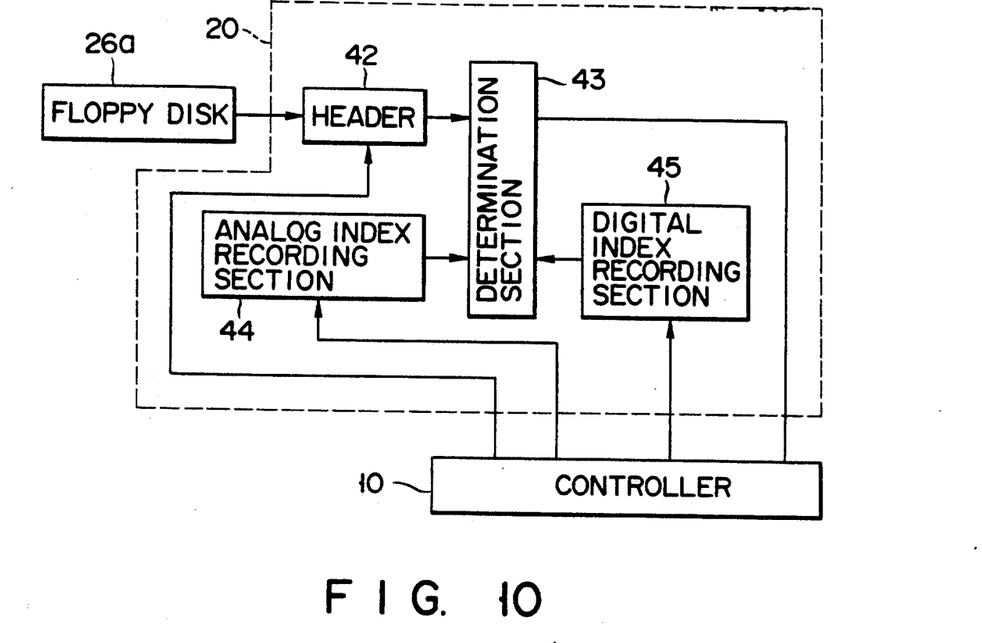
FIG. 10 is a block diagram schematically showing the recording section of an image-sensing apparatus according to a fourth embodiment of the invention.

Referring then to FIG. 10, the recording section of the fourth embodiment, which detects the state of the recording medium and formats the recording medium if it is not formatted, will be explained. FIG. 10 shows only the recording section, since the other components of the apparatus are similar to corresponding ones of the apparatus of FIG. 1. A floppy disk 26a is used as the recording medium, as in FIG. 1.

The floppy disk has an index mark hole (not shown), with respect to which index signals are written therein. Index signals for an analog format, such as synchronizing signals and track number signals, are stored in the form of digital data.

The floppy disk 26a is inserted into the recording section 20. Then, the header 42 of the section 20 detects the index signal of the floppy disk 26a, and outputs it to a determination circuit 43. An analog index recording section 44 is controlled by the controller 10 to output a predetermined index signal stored therein to the determination circuit 43.

Similarly, a digital index recording section 45 is controlled by the controller 10 to output a predetermined index signal to the determination circuit 43.

The determination circuit 43 determines the relationship between these signals, and outputs the determination result to the controller 10.

Figure 11:
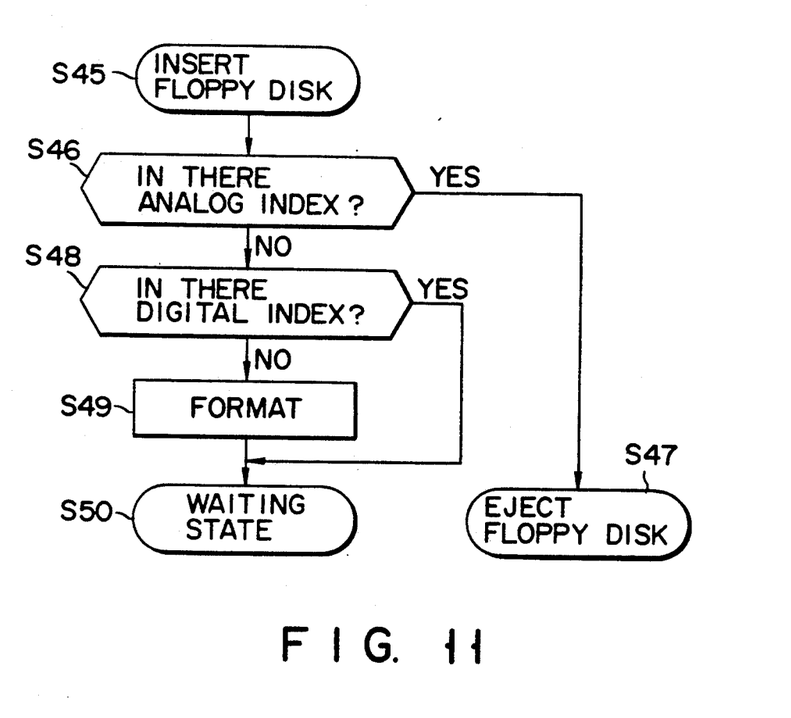
FIG. 11 is a flowchart showing a process of formatting a recording medium incorporated in the recording section shown in FIG. 10.

The manner of formatting the image sensing apparatus constructed as above will be described with reference to the flowchart of FIG. 11.

In a step S45, the floppy disk 26a is inserted into the recording section 20. Only the index signal of the floppy disk is read by the header 42 into the determination circuit 43 in accordance with rotation of the disk and in synchronism with the index mark hole. At this time, that data recording portion of the floppy disk 26a in which the analog data is stored is masked to read in the index signal only.

Further, the determination circuit 43 reads in the predetermined index signal stored in the analog index recording section 44.

Thus, in a step S46, the determination circuit 43 determines whether or not correlation between these two analog index signals is high. If the correlation is high, it is determined that an analog index is already stored, and then the program proceeds to a step S47, where the floppy disk 26a is ejected.

If the correlation therebetween is low, it is determined that there is no analog index, and the same operation as that for reading in the analog index signal is repeated for reading in a digital index signal.

In a step S48, the index signal read out of the floppy disk 26a is compared with an index signal read out of a digital index recording section 32, and it is determined from correlation between these index signals whether or not a digital index is already stored. If it is determined that the correlation is high, i.e., if the answer to the question in the step S48 is Yes, the program proceeds to a step S50, where the recording section 20 in the step S16, hereinafter referred to in more detail, is in a state in which it can store data. If it is determined that the correlation is low, i.e., if the answer to the question in the step S48 is No, the controller 10 transfer an instruction to the recording section 20, thereby formatting the floppy disk 26a in a step S49, followed by the program proceeding to the step S50.

Figure 12:
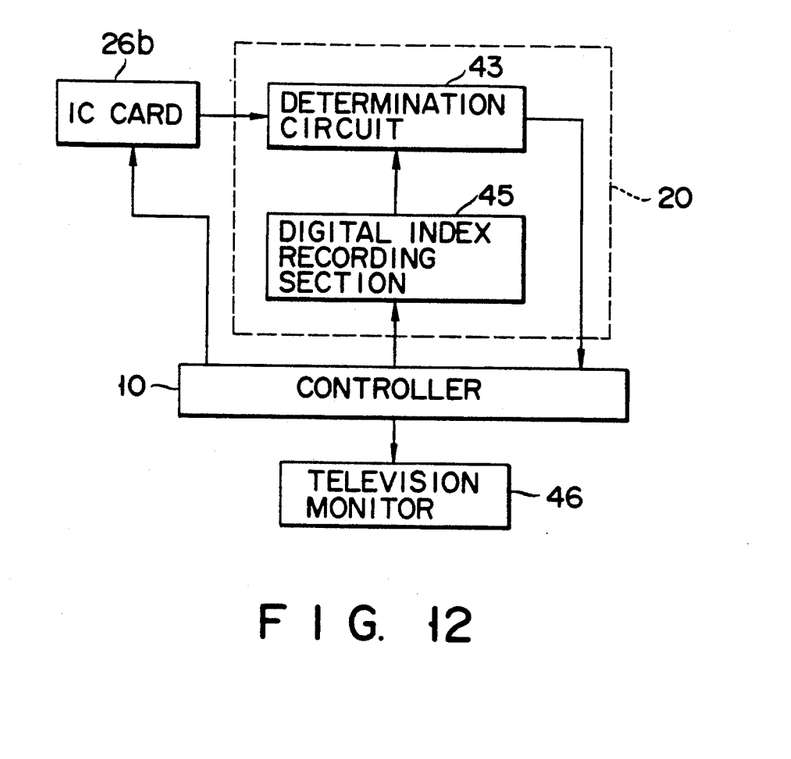
FIG. 12 is a block diagram schematically showing the recording section of an image-sensing apparatus according to a fifth embodiment of the invention.

An image sensing apparatus according to the fifth embodiment of the invention will be explained with reference to FIG. 12. FIG. 12 shows only the components distinguishing the fifth embodiment from the first embodiment of FIG. 1, since the other components are similar to corresponding ones of the latter. In the fifth embodiment, an IC card 26b is used as the recording medium.

The card 26b is inserted into the recording section 20. An index signal is detected from the card 26b, and is read into the determination circuit 43. At this time, the digital index recording section 45 is driven by the controller 10 to output a predetermined index signal stored therein to the circuit 43.

The circuit 43 determines correlation between these index signals, and outputs the determination result to the controller 10.

Figure 13:
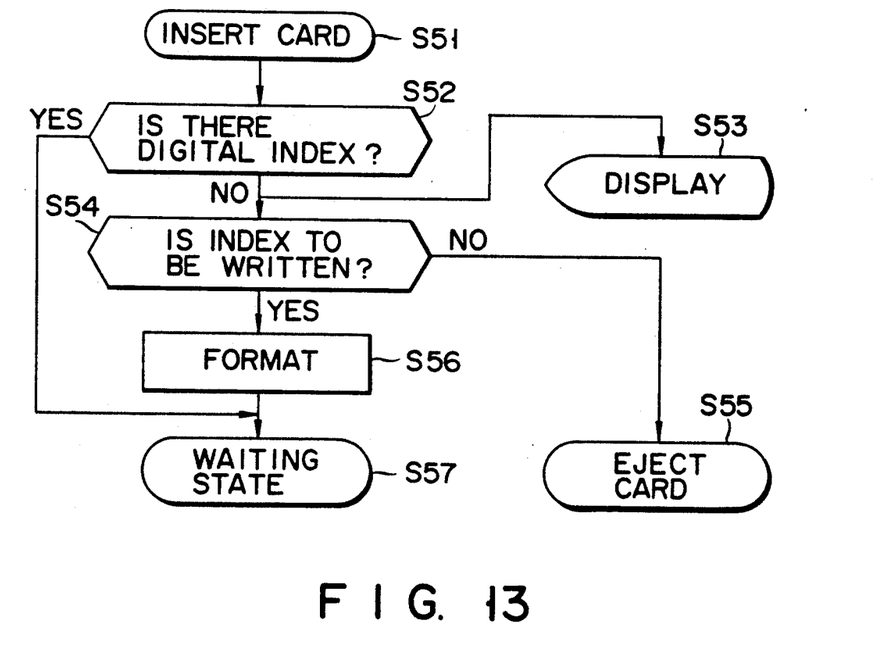
FIG. 13 is a flowchart showing a process of formatting a recording medium incorporated in the recording section shown in FIG. 12.

The manner of formatting the apparatus of the fifth embodiment constructed as above will be described referring to the flowchart of FIG. 13. First, in a step S51, the IC card 26b is inserted into the recording section 20, and only a digital index signal is read out of the card 26b. At the same time, a predetermined digital index signal is read out of the digital index recording section 45.

In a step S52, the index signals read out of the card 26b and section 45 are compared with each other, thereby determining from correlation therebetween whether or not a digital index is stored in the card 26b. If it is determined that the correlation is high, i.e., if the answer to the question in the step S52 is Yes, the program proceeds to a step S57, where the recording section 20 is in a state in which it can store data.

If, on the other hand, it is determined that the correlation is low, i.e., if the answer to the question in the step S52 is No, the program proceeds to a step S53, where the determination result is displayed on the display B. Then, in a step S54, the user determines whether or not to write a digital index into the IC card 26b. If he determines that it is not necessary to write the digital index into the IC card 26b (i.e., to format the IC card 26b), the program proceeds to a step S55, and the IC card 26b is ejected.

However, if it is necessary to write in the digital index, the controller 10 transfers an instruction to the recording section 20 in a step S56, thereby formatting the IC card 26b. Thus, in a step S57, the recording section 20 is in a state in which it can store data.

The above embodiment may be constructed such that the IC card 26b is automatically formatted if it is not formatted.

Figure 14:
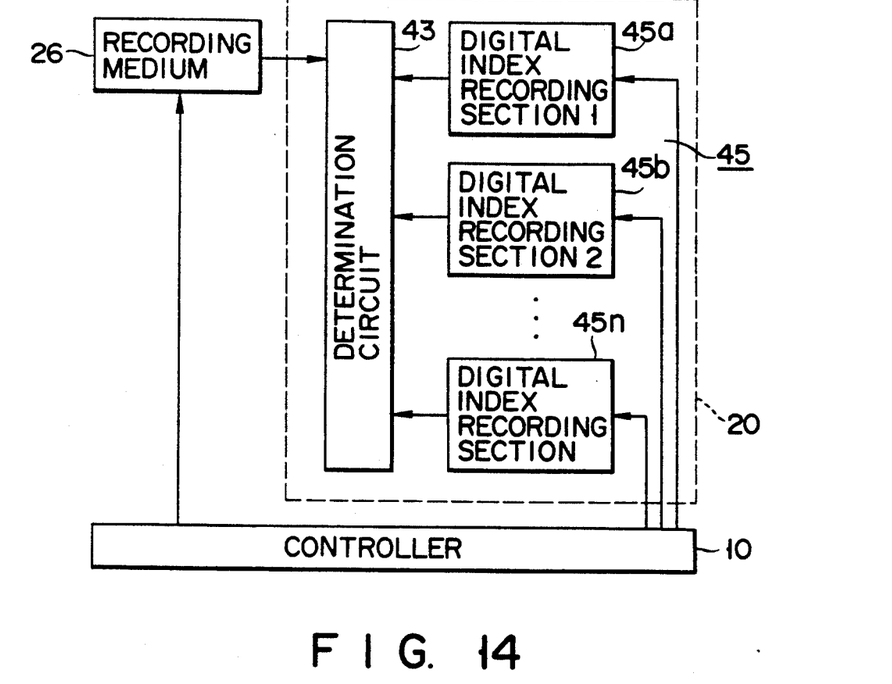
FIG. 14 is a block diagram schematically showing the recording section of an image-sensing apparatus according to a sixth embodiment of the invention.

An image sensing apparatus according to a sixth embodiment of the invention will be explained referring to FIG. 14. For the same reason as in the fifth embodiment, there are shown only the components distinguishing this embodiment from the others.

In the apparatus, the recording medium 26 is inserted into the recording section 20, and an index signal is detected from the medium 26, and then output to the determination circuit 43.

A plurality of digital index recording sections 45a–45n, having different disk operation systems (DOSs) recorded therein and arranged in parallel with one another, are connected to the circuit 43. The sections 45a–45n are controlled by the controller 10 to output predetermined index signals to the circuit 43, respectively.

Figure 15:
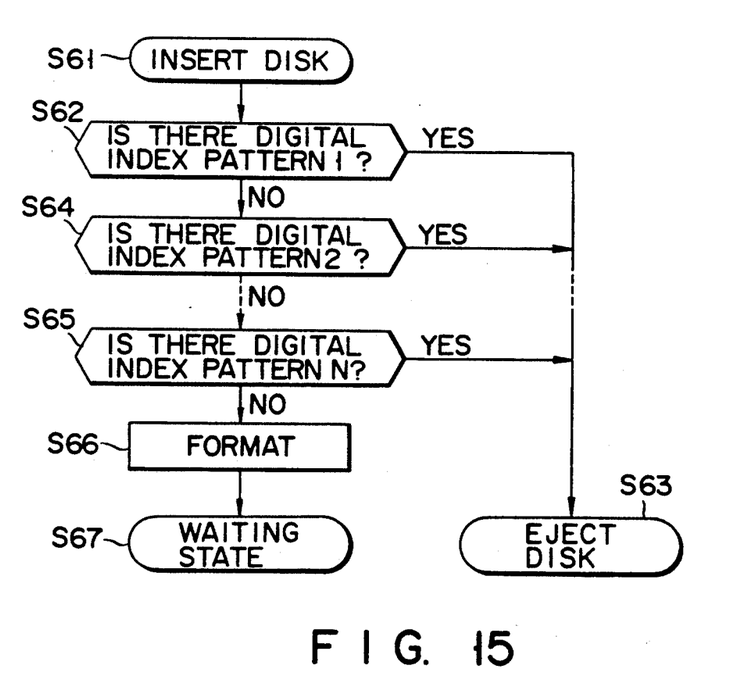
FIG. 15 is a flowchart showing a process of formatting a recording medium incorporated in the recording section shown in FIG. 14.

The manner of formatting the apparatus of the sixth embodiment will be explained with reference to the flowchart of FIG. 15. In a step S61, the recording medium 26 is inserted into the recording section 20. Only a digital index signal is read out of the medium 26, and supplied to the determination circuit 43. At the same time, predetermined index signals stored are serially read out of the digital index recording sections 45a–45n, and supplied to the circuit 43.

Through steps S62, S64, and S65, the circuit 43 compares the digital index signal of the medium 26 with predetermined index signals of the index recording sections 45a–45n, respectively. If it is determined that there is a digital index in the recording medium 26, i.e., if the answer to the question in the step S62 is Yes, the program proceeds to a step S63, where the medium 26 is ejected.

If, on the other hand, it is determined that there are no digital indexes, i.e., if the answers to the questions in the step S62, S64, and S65 are all No, the program proceeds to a step S66, where the controller 10 supplies an instruction to the recording section 20, thereby formatting the recording medium 26, followed by the program proceeding to a step S67, where the recording section 20 is in a state in which it can store data.

This image sensing apparatus has digital index recording sections of substantially the same number as that of DOSs prevailing in the market, and therefore can use such various DOSs.

The recording sections can automatically determine whether or not a recording medium is formatted, and format it if it is not formatted. Further, the apparatus of the invention formats a recording medium in a state where the medium is inserted therein, which does not require any particular separate devices or personal computers for formatting.

Moreover, if it is determined at the time of inserting a recording medium in the apparatus that the medium is not formatted, it is automatically initialized.

As is described in detail, the image sensing apparatus of the invention can easily and promptly search those areas of the main tracks of a floppy disk which store no data, or search or edit (e.g. copy) stored data, with the use of control data of a queue track and without an overhead, and further can automatically detect whether a recording medium is formatted upon insertion thereof, and then automatically initialize the recording medium to have a suitable format if it has no formats.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An electronic still camera for recording an image signal, supplied from an image sensing element attached to a main body of the electronic still camera, in a recording medium, comprising:

converting means for converting the image signal into a digital signal having a predetermined format;

determination means for determining, upon insertion of the recording medium in the electronic still camera, whether the recording medium was initialized in a predetermined format;

control means for reading a disk formatting data signal including disk formatting data from said recording medium, said control means including means for verifying whether the disk formatting data signal has a specific initialized state; and recording means, including reformatting means for reformatting data in the recording medium in a given manner, if the determination means determines that the recording medium does not have the predetermined format;

said recording means recording in the recording medium the digital signal having the predetermined format, if the determination means determines that the recording medium has the predetermined format; and said recording means recording the data reformatted in the given manner in the recording medium, if the determination means determines that the recording medium does not have the predetermined format.

2. The electronic still camera according to claim 1, wherein:

the recording means includes means for recording a plurality of formats, including the predetermined format; and the reformatting means does not reformat the data in the recording medium, if the format of the recording medium corresponds with one of the plurality of recorded formats, including the predetermined format.

3. The electronic still camera according to claim 1, further comprising:

display means for displaying a format state of the recording medium if the determination means determines that the recording medium does not have the predetermined format; and ascertaining means for ascertaining whether the recording medium should be formatted; and wherein the reformatting means reformats the recording medium, if the ascertaining means ascertains that the recording medium should be re-formatted, and ejects the recording medium if the ascertaining means ascertains that the recording medium should not be re-formatted.

4. An electronic still camera according to claim 1, wherein the disk formatting data comprises:

a header area;

a directory area; and a Record Allocation Table area.

5. An electronic still camera according to claim 4, wherein:

the Record Allocation Table area includes a plurality of sectors, said plurality of sectors representing all of a plurality of sectors of a plurality of main tracks in said recording medium.

6. An electronic still camera according to claim 4, wherein the directory area of the disk formatting data includes control data for indicating recording characteristics, including at least one of:

unused record areas;

erased record areas;

record areas in which data cannot be written;

record areas from which data cannot be erased;

record areas from which data cannot be read out;

record areas having preserved bits; and record areas for indicating a content of a record.

7. An electronic still camera according to claim 6, wherein the content of a record comprises data relating to at least one of:

the image;

a voice;

a record name;

a record extended name;

a time at which the record is at least one of formed and finally edited;
a data on which the record is at least one of formed and finally edited;
a leading portion of a sector number that comprises a predetermined number of columns;
a record size;
a comment by a composer of the record;
an explanation of an usual record; and
an abnormal sector.

8. An electronic still camera according to claim 4, wherein the header area comprises data relating to at least one of:
a format number;
a disk name;
a disk number;
a number of used sectors;
a number of unusable sectors;
a number of remaining sectors; and
a name of a composer of the record.

9. The electronic still camera according to claim 1, further comprising:
second control means including means for determining a number of remaining sectors of the recording medium;
said second control means including:
means for enabling a disk full state to be displayed on a display means when there is no remaining sector in the recording medium; and
means for enabling execution of an error-solving operation including a disk ejection operation and a disk formatting operation.

* * * * *